United States Patent
Nougayrede et al.

(10) Patent No.: US 10,131,542 B2
(45) Date of Patent: Nov. 20, 2018

(54) METHOD AND DEVICE FOR DEGASSING LIQUID SULPHUR

(71) Applicants: Air Liquide Global E&C Solutions Germany GmbH, Frankfurt am Main (DE); NGD Consult, Pau (FR)

(72) Inventors: Jean Nougayrede, Pau (FR); Wolfgang Nehb, Frankfurt am Main (DE); Eckhard Juengst, Frankfurt am Main (DE)

(73) Assignees: Air Liquide Global E&C Solutions Germany GmbH, Frankfurt am Main (DE); NGD Consult, Pau (FR)

( * ) Notice: Subject to any disclaimer, the term of this patent is extended or adjusted under 35 U.S.C. 154(b) by 761 days.

(21) Appl. No.: 14/368,180

(22) PCT Filed: Nov. 5, 2012

(86) PCT No.: PCT/EP2012/071808
§ 371 (c)(1),
(2) Date: Jun. 23, 2014

(87) PCT Pub. No.: WO2013/091972
PCT Pub. Date: Jun. 27, 2013

(65) Prior Publication Data
US 2014/0366731 A1    Dec. 18, 2014

(51) Int. Cl.
*B01D 19/00* (2006.01)
*C01B 17/02* (2006.01)

(52) U.S. Cl.
CPC ...... *C01B 17/0232* (2013.01); *B01D 19/0047* (2013.01)

(58) Field of Classification Search
CPC ..... B01D 19/0047; B01D 19/00–19/04; C01B 17/0232; C01B 17/00–17/98
(Continued)

(56) References Cited

U.S. PATENT DOCUMENTS

| 4,131,437 A | 12/1978 | Campbell et al. |
| 4,612,020 A | 9/1986 | Fischer et al. |

(Continued)

FOREIGN PATENT DOCUMENTS

| GB | 1433822 | 4/1976 |
| GB | 2203732 | 10/1988 |

(Continued)

OTHER PUBLICATIONS

PCT International Preliminary Report on Patentability for PCT/EP2012/071808 corresponding to this new U.S. Appl. No. 14/368,180, dated Jul. 3, 2014 (8 pages).

(Continued)

*Primary Examiner* — T. Bennett McKenzie
(74) *Attorney, Agent, or Firm* — Pauly, Devries Smith & Deffner LLC (57) ABSTRACT

Embodiments of the invention include a method for degassing liquid sulphur in a container, a first area of the container being flooded with liquid sulphur and a second area of the container being flooded with a gas, and a gas flow being injected into the first area, wherein liquid sulphur is sprayed into the second area. Embodiments of the invention include a device for degassing liquid sulphur having a container comprising two adjacent areas, the first area being flooded with liquid sulphur and the second area being flooded with gas, and having at least one device for injecting a gas flow into the first area, characterized by a device for spraying liquid sulphur opening into the second area. Other embodiments are also included herein.

6 Claims, 3 Drawing Sheets

(58) Field of Classification Search
USPC .......................................... 95/260; 261/78.2
See application file for complete search history.

(56) References Cited

U.S. PATENT DOCUMENTS

| | | | |
|---|---|---|---|
| 4,849,204 A * | 7/1989 | Voirin | .................. C01B 17/0232 |
| | | | 423/564 |
| 5,030,438 A | 7/1991 | Voirin et al. | |
| 5,632,967 A * | 5/1997 | Nasato | ................ C01B 17/0232 |
| | | | 423/567.1 |
| 6,010,677 A | 1/2000 | Scheybeler | |
| 6,149,887 A | 11/2000 | Lagas et al. | |
| 7,927,577 B2 | 4/2011 | Rameshni et al. | |
| 2005/0260121 A1 * | 11/2005 | Louie | ................... C01B 17/165 |
| | | | 423/578.1 |
| 2010/0178236 A1 * | 7/2010 | Rameshni | .......... B01D 19/0047 |
| | | | 423/578.4 |
| 2011/0020212 A1 * | 1/2011 | Tonjes | ................ C01B 17/0232 |
| | | | 423/576.2 |
| 2011/0182802 A1 * | 7/2011 | Garg | ........................ B01J 19/32 |
| | | | 423/578.1 |

FOREIGN PATENT DOCUMENTS

| | | |
|---|---|---|
| WO | 9507854 | 3/1995 |
| WO | 03106335 | 12/2003 |

OTHER PUBLICATIONS

Rameshni, Mahin P., "A New Standard for Sulphur Collection Systems with Integrated Degassing (RCS-D)." Worley Parsons, date unknown (22 pages).

* cited by examiner

METHOD AND DEVICE FOR DEGASSING LIQUID SULPHUR

CROSS-REFERENCE TO RELATED APPLICATIONS

This application is a national stage application under 35 U.S.C. 371 of International Patent Application Serial No. PCT/EP2012/071808, entitled "VERFAHREN UND VORRICHTUNG ZUR ENTGASUNG VON FLÜSSIGEM SCHWEFEL" filed Nov. 5, 2012, which claims priority from document EP 11 290 609.4, filed Dec. 23, 2011, the disclosures of which are hereby incorporated by reference herein in their entirety.

FIELD OF THE INVENTION

The invention relates to a method for degassing liquid sulphur in a container comprising two adjacent areas, wherein a first area of the container is flooded with liquid sulphur and a second area of the container is flooded with a gas, and wherein a gas flow is injected into the first area, as well as to a device for degassing of liquid sulphur with application of the method according to the invention.

BACKGROUND

Gases dissolved in liquids always pose the risk of increased corrosion in the plant. Gaseous impurities are present in liquid sulphur in particular in the form of $H_2S$ (hydrogen sulphide), $H_2S_x$ (hydrogen polysulphides), $SO_2$ (sulphur dioxide) and possibly other gaseous sulphur compounds.

$H_2S$ is a very dangerous compound, since it is poisonous in the air in a concentration of less than 10 ppm by volume, and is life-threatening at a concentration of some 100 ppm by volume. In addition, hydrogen sulphide may form an explosive mixture in air upon reaching a concentration of >3.4% by volume.

$H_2S$ tends to outgas from the liquid sulphur when this is shaken and cooled, which occurs in particular during handling, storage and transport. The dangerous gas then collects in the gaseous phase of the storage and transport containers. If solid sulphur is produced from non-degassed liquid sulphur, $H_2S$ and SO2 also evolve naturally from the sulphur. In both cases, non-degassed liquid sulphur is thus a source of volatile emissions of H2S and SO2 in storage areas and thus causes not only contaminant nuisances and environmental pollution, but also poses a considerable safety risk.

For all these reasons, it is necessary to remove $H_2S$ by degassing from the raw sulphur produced so as to prevent all risks of toxicity, development of fire and risk of explosion during handling, storage and transport.

The industrial companies concerned with sulphur (producers, hauliers and end consumers) have agreed on international regulations which define the specification of the commercial product, and inter alia have limited the total residual amount of hydrogen sulphide to a maximum of 10 ppm by weight.

A range of methods are known with which the content of hydrogen sulphide in the liquid sulphur is to be reduced to less than 10 ppm.

With the D'GAASS method, as is described in WO 95/07854 A for example, sulphur is fed in a column having a plurality of separation stages in counterflow to pressurised air. The phase transport is facilitated by column internals to increase the contact area.

In the Shell degassing process (for example see U.S. Pat. No. 6,149,887), the phase transition from the liquid into the gas phase is facilitated by bubbling air into the sulphur. By air flushing, the $H_2S$ is fed together with the bubbled-in air for afterburning. The Exxon Mobil degassing technology (for example see U.S. Pat. No. 7,927,577 B2) also functions in a similar manner. In this case, too, a multiplicity of Venturi nozzles are located on the base of a container which is flooded, at least in part, with liquid sulphur and through which the stripping gas introduced into the nozzles forms small bubbles and thus removes dissolved hydrogen sulphide from the liquid sulphur.

Further methods which are based on a degassing of the liquid sulphur using a stripping gas are described, for example, in U.S. Pat. No. 6,149,887 or WO 03/106335 A1. In U.S. Pat. No. 6,149,887 a gas is fed through the liquid sulphur, wherein the liquid sulphur itself is also pumped around. It passes through at least two degassing compartments, wherein these degassing compartments are each divided again into two sub-compartments and the degassing compartments are separated from one another by at least one partition wall. The gas is then injected into at least one of the sub-compartments in finely distributed form via the base. A flow of the liquid sulphur is produced by openings between sub-compartments and the degassing compartments, whereby the transition conditions at the gas-liquid interface are favourable.

WO 03/106335 A1 lastly describes a method for removing hydrogen sulphides from liquid sulphur, in which liquid sulphur is introduced into a container from top to bottom and flows into an outer ring via an outlet in the lower face of the device, which outer ring is gassed with air.

The common point of all these methods is that no additional degassing agent can be introduced into the liquid sulphur. With suitable procedure, the hydrogen sulphide content can thus still be reduced below the legally required threshold of 10 ppm by volume, wherein air has to be used, however, as stripping gas.

In addition to desired reactions in the system, the use of air also leads to a direct oxidation of $H_2S$ and $H_2S_x$ as well as of the sulphur itself, whereby some $SO_2$ is formed in the sulphur in a dissolved state in an amount of up to several 100 ppm by weight, depending on the temperature.

Some of the $SO_2$ is again found in the stripping air together with the outgassed $H_2S$, which contributes to the sulphur losses of the method as a whole.

Owing to the introduction of the oxygen contained in the air as well as the formation of sulphur dioxide, further oxidation reactions also take place. As a result thereof, the fraction of SO3 and other high-grade oxidation products contained in the system, namely sulphur in an oxidation stage of 6+($H_2SO_4$, polythionic acids, etc.) is considerably increased, which in turn leads to an increase in the acidity of the sulphur and subsequent corrosivity produced thereby.

The described methods for degassing generally require very long times of degassing (10 to 20 hours), which leads to increased $SO_2$ formation.

If, by contrast, inert gas is used as stripping gas, all sulphur compounds cannot be removed reliably. These may decompose with the further use of liquid sulphur, whereby new $H_2S$ is formed. A degassing, which thus removes the hydrogen sulphide only in the short term, and not the hydrogen polysulphides, is therefore not suitable for processing liquid sulphur in such a way that the legal thresholds of residual H2S are observed in a sustainable manner.

For this reason, a range of methods for degassing liquid sulphur have been developed which utilise a catalyst. Above all, the Aquisulf® method is known (see EP 0 252 836 B1). In this case polysulphide chains are destroyed catalytically, wherein the Aquisulf® liquid catalyst is used. The $H_2S$ thus produced and the dissolved $H_2S$ are transported from the liquid phase into the gaseous phase by atomising the sulphur into chambers by means of pumps and spraying nozzles.

DE 28 42 141 also describes a method for degassing liquid sulphur using a catalyst. A three-stage column is flushed with an ammonia-containing nitrogen gas and the individual stages are charged with sulphur and a gas mixture in co-current flow.

However, the use of ammonia leads to lasting damage to the plant components.

SUMMARY

The object of the present invention is therefore to provide a method in which dissolved $H_2S$ as well as other hydrogen polysulphides contained in the system are reliably removed, the formation of $SO_2$ is kept low and, at the same time, the use of a catalyst is unnecessary.

This object is achieved with the invention by a method described herein. For this purpose a first area of a container is flooded with liquid sulphur and a second area of the container above the liquid phase is flooded with a gas. A gas flow is injected into the first area, wherein this injection can take place in such a way that a multiplicity of gas bubbles which are as small as possible are formed. In addition, liquid sulphur is sprayed into the second area, which is flooded with gas, wherein this spraying takes place in such a way that the sulphur is atomised as finely as possible.

In the method according to the invention the conditions of gas diffusion from liquid phase to gaseous phase are now favoured to such an extent that the gas-liquid interfaces are increased on the whole in terms of contact area, but interfaces are also produced which differ in particular in terms of the respective concentration. Three types of interface are now provided for the first time, namely
  1. the interface which is formed by the bubbling through of the liquid sulphur with stripping gas,
  2. the interface which is formed at the separation between sulphur and gas phase, and
  3. the interface which is formed by atomising sulphur into the gas phase.

The courses of this method will be explained briefly hereinafter. In the raw sulphur produced from the sulphur recovery process, the $H_2S$ is present in two forms: free $H_2S$ physically dissolved and $H_2S_x$ (sulphanes or hydrogen polysulphides). Depending on the production conditions of the sulphur, the total content of H2S in both compounds is between 250 and 500 ppm by weight based on the total content of sulphur.

The free hydrogen sulphide and the hydrogen polysulphides are bonded together by the following chemical equilibrium:

$$H_2S_x \leftrightarrow H_2S + S_{x-1}$$

The purpose of the degassing is to remove the free $H_2S$ and the $H_2S$ present in the form of hydrogen polysulphides. The ratio between hydrogen sulphide and hydrogen polysulphides within the liquid sulphur fluctuates depending on temperature, wherein it increases with increasing temperature (20:80% by weight at 130° C., 50:50% by weight at 150° C.).

In accordance with this equilibrium the decrease in the partial pressure of the hydrogen sulphide favours the breakdown of the sulphanes, which is sought by the gas stripping of the sulphur. Owing to the chemical equilibrium, the breakdown kinetics of the hydrogen polysulphides become the most important parameter which limits the efficacy of the degassing process. In particular this parameter is decisive for the duration of the degassing process.

The breakdown kinetics of the $H_2S_x$ are affected by the chemical nature of the stripping gas used in the first area and of the gas flooding the second area, wherein two different gas types can be used:

The first type are inert gases, that is to say gases which do not chemically react with the sulphur and the impurities contained therein. Typical inert gases are $N_2$, $CO_2$ or residue gases from a sulphur production plant (for example Claus units, and associated tail gas treating units), more specifically under the condition that these gases do not contain more than about 5,000 ppm by volume of residual sulphur compounds, such as $H_2S$.

Water vapour may also be used, but can be mixed with inert gases. With these stripping gases the efficacy of the stripping process is determined exclusively by the physical conditions of the diffusion of the hydrogen sulphide through the gas-liquid separation layer. Owing to the creation of three different interfaces, hydrogen sulphide can be removed more quickly from the system, whereby hydrogen polysulphides are decomposed to form new hydrogen sulphide as a result of the equilibrium reaction.

As a second gas type, reactive gases may also be used which, in addition to the stripping effect, are also reaction partners with the sulphur and/or the impurities contained therein. The most effective and simultaneously most economical stripping gas is air in this instance. Apart from the physical effect of the stripping process on the removal of the hydrogen sulphide, direct oxidation reactions of the $H_2S$ and of the $H_2S_x$ occur, as a result of which the equilibrium is shifted more towards the breakdown side. The concept of the reactive stripping process builds on these reaction courses.

The oxidation products ($SO_2$, $SO_3$, thionic acids) are described by some authors as initiators of the decomposition of hydrogen polysulphides. The chemistry of the air-sulphur system is complex and is illustrated merely in a simplified manner by the following (stoichiometrically incorrect) reaction equilibriums:

$$H_2S/H_2S_x + O_2 \leftrightarrow S, SO_2, SO_3, H_2O$$

$$S + O_2 \leftrightarrow SO_2, SO_3$$

$$2H_2S + SO_2 \leftrightarrow S + H_2O$$

Figure 1:
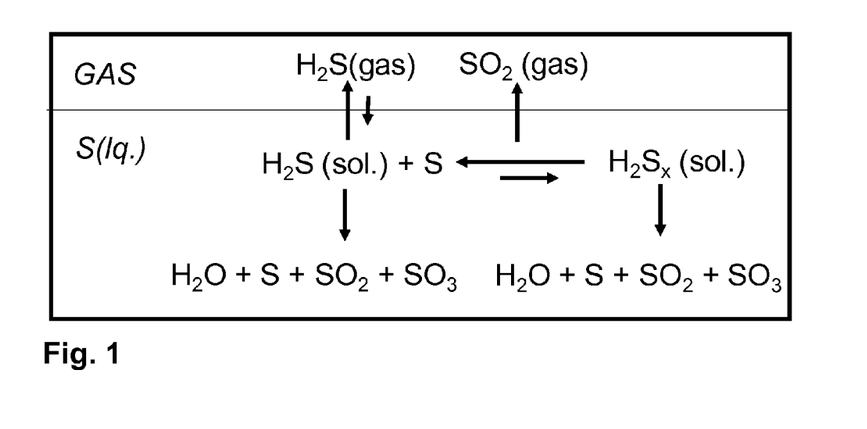
FIG. 1 shows a basic degassing principle scheme.

These chemical courses and physical exchange processes between gas and liquid phases are illustrated schematically in FIG. 1.

With air stripping the entire kinetics of the degassing are noticeably accelerated by the oxidation reactions. Under identical stripping conditions (gas-liquid diffusion) the air is able to reach the predefined 10 ppm by weight for residual $H_2S$ more quickly. The stripping process can take place in a shorter amount of time and in smaller plants. However, the use of air has a detrimental effect on the sulphur quality owing to the formation of $SO_2$, since sulphur is discharged and oxidation products are formed which lead to an increase in acidity and subsequent corrosivity. Owing to the formation of three different interfaces, however, the residence time in the system is considerably reduced, which is why the infiltration of oxygen is minimised.

In principle it is conceivable that the gas flow introduced into the liquid sulphur of first area differs in nature from the gas flow flowing through the second area. In order to minimise or completely prevent the formation of $SO_2$, it is possible in particular to undertake the bubbling through using inert gas. It is possible to charge only the gas flow used for bubbling through with inert gases and/or to charge the gas flow located in the second area with inert gases. This has the advantage that the infiltration of large amounts of oxygen during the bubbling through process can be reduced.

By contrast, the use of the same gas for all gas flows reduces the number of supply devices required and thus reduces the capital costs.

It has also proven to be favourable if the liquid sulphur which is injected into the first area originates from the second area and is pumped out of this area into the device for spraying. A flow within the liquid sulphur is thus produced, which ensures thorough mixing of the system and thus homogeneous degassing.

It is further advantageous if a gas flow flows through the second area flooded with gas, wherein this circulation should occur primarily parallel to the surface of the liquid sulphur in a particularly preferred manner. It is thus ensured that the concentration gradient is maximised both in terms of the interface between the two areas and in terms of the interface formed by the spraying of the sulphur, and that hydrogen sulphide contained in the gas phase does not return to the liquid sulphur.

Particularly efficient atomisation and complete thorough mixing are achieved if the spraying of the liquid sulphur into the second area occurs in counterflow to the gas flow flowing through the second area.

It is further possible to carry out the method discontinuously with regard to the sulphur as a batch method. Such a method comprises the prior processes in succession:
1. filling of the container with the sulphur to be degassed.
2. degassing of the sulphur by bubbling through with gas and atomising the sulphur, possibly also with recirculation of the sulphur and flushing of the second area until the necessary $H_2S$ residual content in the sulphur is achieved.
3. emptying degassed sulphur from the container.

The total degassing duration of such a sulphur batch is typically 6 to 12 hours depending on the dimensioning of the systems, in particular depending on the recirculation capacity of the pump for pumping the sulphur around, the stripping power of the bubbling through and a possible additionally used catalyst.

Furthermore, the method according to the invention may also be carried out as a continuous method. For this purpose the method is thus carried out similarly to the batch method, but raw sulphur is constantly fed into the degassing container d and a corresponding amount of treated sulphur is removed.

The degassing can occur in a continuous method in a plurality of chambers, such as two chambers, wherein the raw sulphur enters the first chamber, into which it is continuously atomised. The liquid sulphur then flows into a second chamber through an opening in the partition wall, such as at the base of the container. In the second chamber the sulphur is kept moving by a circulation pump, wherein the raw sulphur is atomised in the gas area of the second chamber. The degassed sulphur is then also removed continuously from the second chamber.

The bubbling through may take place in both chambers or else in just one chamber, such as the second chamber. If only one chamber is bubbled through, the amount of oxygen incorporated can also be minimised with use of air as the stripping gas.

The gas flow which flows in the area flooded with gas does not necessarily have to be pumped, but instead it is suffice to provide it at atmospheric pressure since a vacuum is produced in the second area of the first chamber by the continuous drawing of the gas.

The flushing and bubbling through gases mix above the sulphur in the area flooded firstly and are removed with the degassing products, primarily $H_2S$. For this purpose a steam jet system based on an ejector can be used and sucks up the gases and entrains them. Such gases are generally led to a combustion plant (an incinerator or a reaction furnace of the parent Claus unit).

In principle it is also, furthermore possible to additionally carry out a catalytic degassing. This is particularly recommended if the stripping process is carried out with inert gases and the oxidation reactions are thus missing. There are catalysts which may be used advantageously to accelerate the degassing in the method, since they promote the breakdown of hydrogen polysulphides. The most effective catalysts are compounds which are characterised by their chemical base function, more specifically nitrogen compounds of the amino type in general, in particular ammonia, urea, secondary and tertiary amines (weak bases), heterocyclic nitrogen compounds, quinoline ($C_9H_7N$) and morpholines ($C_4H_9NO$), or solid catalysts based on aluminium oxide ($Al_2O_3$), in particular activated aluminium oxides, and aluminium oxides doped with Fe salts, Ni salts, or Ti salts.

A further decisive parameter for the course of the method according to the invention is the temperature of the liquid sulphur. The content of $H_2S$ and $H_2S_x$ dissolved in liquid sulphur depends largely on temperature. Owing to the chemical equilibrium between the sulphanes and the hydrogen sulphide, this dependence does not follow the normal physical law of absorption. Under the effect of the increase in sulphanes, the amount of the total content of $H_2S$ increases with temperature. If both substances are present in equilibrium, the ratio by weight of $H_2S_x$ to $H_2S$ at 150° C. is approximately 50:50, but at 130° C. is only approximately 20:80. The cooling of the sulphur with a reduction in the sulphane fraction consequently facilitates the degassing. In the event of an excessively high temperature of the raw sulphur (>140° C.), this cooling may be included in the proposed process. The sulphur can be brought to a temperature between 130 and 135° C. A cooling process can be also carried out during the recirculation of the sulphur so that the sulphur is cooled when it is pumped out of area 1 for atomisation into area 2.

During the sulphur degassing with air, a different amount of $SO_2$ is produced depending on different method parameters, wherein some of the $SO_2$ remains in the sulphur in the dissolved state (approximately 100 ppm by weight).

Sulphur dioxide is an extremely poisonous, dangerous and environmentally harmful product. It causes volatile emissions and collections of sulphur dioxide in the surroundings of liquid and solid sulphur plants, which is why these plants have to be equipped with suitable aeration systems and devices to control this emission. In particular this applies to plants for storage of granulated solid sulphur. The same problem also occurs with transport means. For reasons concerning environmental protection and depending on the use of sulphur, further requirements may be necessary to also minimise, in addition to the hydrogen sulphide, the sulphur dioxide in the liquid sulphur. The method according to the invention makes it possible to also remove the $SO_2$ by degassing in an additional and ultimate degassing step of the sulphur treatment, after the $H_2S$ degassing with air.

The removal of the $SO_2$ by degassing occurs by the same principle as the degassing with regard to $H_2S$. In this case, too, sulphur is atomised within an area flooded with gas, and the area adjacent to this gas area and containing liquid sulphur is bubbled through with stripping gas. In this case inert gas is used as stripping gas. In this case it is favourable to use a tail gas from a sulphur production plant or an associated tail gas treating plant (TGT) (such as residue gases from a TGT plant of the SCOT or LTGT type which supply residue gases flushed with amines and completely free from $SO_2$ with an $H_2S$ content of approximately 100 to 300 ppm by volume). After the $SO_2$ removal, the stripping inert gas carrying the degassed $SO_2$ can be fed as a gas flow into the second area, flooded with gas in the upstream chambers where the $H_2S$ removal is taking place.

With regard to the removal of $SO_2$, the method can be optimised to such an extent that the sulphur is heated and the solubility of the sulphur dioxide is thus reduced. Heating should be carried out to a temperature of 160° C. at most (a permissible threshold for viscosity of liquid sulphur), such as 150 to 160° C. It has proven to be favourable to carry out such a heating of the sulphur within the scope of the recirculation of the sulphur to the sprayers.

With the method according to the invention the entire degassing of the sulphur is carried out so successfully that residual values of the cumulative $H_2S+SO_2$ content are between 10 and 20 ppm by weight.

It has also proven to be favourable if the amount of $H_2S$ and/or $SO_2$ is/are used as a control variable for the residence time of the liquid sulphur during the degassing.

The invention further includes a device suitable for carrying out the method according to the invention. Such a device comprises a container in which two adjacent areas are located. The first of these areas is flooded with liquid sulphur, and the second area is flooded with a gas. A gas flow is injected into the first area filled with liquid sulphur. The injection can be carried out using a multiplicity of nozzles so that a bubbling through of the sulphur with stripping gas occurs. It has proven to be particularly favourable to carry out this injection in the vicinity of the base of the container. A device for spraying liquid sulphur opens into the second area, wherein the spraying should take place in such a way that the liquid sulphur reaches this gas phase in a finely atomised manner.

The device is thus designed in such a way that the diffusion of the $H_2S$ from the liquid phase to the gas is promoted by improving the transition conditions at the gas-liquid interface and by increasing the overall gas-liquid contact area. The stripping device consists of three combined and integrated contact systems:

1. A contact system by bubbling through with stripping gas in the sulphur mass with the aid of diffusors, such as jet apparatus diffusors which can be arranged at the base of the chamber. The gas is dispersed in the form of bubbles in the liquid sulphur, which forms the continuous phase of the system. The gas/sulphur contact occurs in counterflow.

2. A contact system by atomising the sulphur in the gas phase. The sulphur is dispersed in the form of droplets into the gas, which forms the continuous phase. The gas phase is made flowing through the atomised sulphur.

3. A contact system at the interface between sulphur and gas phase. This interface is constantly renewed by atomising the sulphur and by the bursting of the stripping gas bubbles occurring at the surface.

The contact systems are arranged in a sulphur recirculation loop which is kept going by a pump which transports the sulphur successively to the atomising and bubbling through systems. The pump receives the sulphur, such as in the vicinity of the base of the container, and feeds it to the atomising device. The two systems are thus arranged in a sulphur recirculation single loop.

The design and dimensioning of the plant depends on the type and manner of the industrial implementation of the method. The dimensioning parameters are:

The sulphur volume in the degassing container; with a continuous method this determines the necessary residence time of the sulphur for the reactions and in particular the breakdown of the hydrogen polysulphides (the kinetics of which are slower and therefore are a limiting factor for the degassing capacity)

The stripping gas bubble-through amounts and flushing gas amounts

The recirculation amount (R) of the sulphur with the pump (P)

The dispersion of the gas bubbles in the liquid phase

The mode of atomisation of droplets in the gas phase.

It has also proven to be favourable to equip the second area flooded with gas with a feed and an outlet gas line, whereby a further gas flow is guided through the second area, such as parallel to the surface of the liquid sulphur. On the one hand, the stripping effect at the interface between sulphur phase and gas phase is thus enhanced since the flushing gas now spreads over the surface of the liquid sulphur. On the other hand, it is thus possible to atomize the sulphur in counterflow to the flushing gas.

It is possible to carry out the method according to the invention in a batch degassing procedure. The liquid sulphur is treated in batches in this instance. A pump feeds the sulphur to the stripping system, in which a triple degassing takes place, namely 1. by atomising the sulphur in the flushing gas,
2. by direct bubbling of the gas through the sulphur, and
3. by contact of flushing gas at the interface between the first and second areas.

The stripping gases containing the outgassed ($H_2S$) and the produced and outgassed ($SO_2$) are drawn from the container via a discharge system (for example an ejector steam jet) and are usually fed to a combustion plant.

The degassing takes place in a closed area, generally a pit made of acid proof concrete and stone or a steel container.

It is furthermore also possible to design the device according to the invention in such a way that it is possible for the method to progress continuously. It has been proven to be particularly favourable to divide the container into at least two chambers, wherein raw sulphur is constantly fed into the first chamber and a corresponding amount of treated sulphur is constantly removed from the last, such as the second chamber. Each chamber is equipped with a pump system consisting of a recirculation pump and an atomising system. The raw sulphur, for example discharged from a Claus plant enters the first chamber, where it is continuously drawn up by the pump system and is atomised into the second area. The sulphur may enter the second chamber through an opening in the partition wall at the base of the compartment. An identical pump system is located in the second chamber. The degassed sulphur is removed continuously by a split stream at the discharge of the recirculation pump.

The stripping gas can be introduced simultaneously by two different systems. On the one hand by the inlet and outlet line, which each open into the second area flooded with gas, and on the other hand by a fan for stripping by gas injection. In this case a corresponding device is located in the liquid sulphur mass, wherein this can be a nozzle/jet apparatus device which can be arranged on the base of the respective chambers.

The degassing products are removed from the chambers together with the flushing and bubbling through gases, wherein a steam jet system can be used in this case.

The degassing may be carried out particularly successfully at temperatures between 130 and 150° C., which is why a device according to the invention can be equipped with at least one cooling device. It has proven to be particularly favourable to arrange at least one cooling device between pump and spraying and to thus cool the sulphur within the recirculation process.

For purposes of greater efficacy, a catalyst may also be used, which for example is introduced with the aid of an injection device on the suction side of the pump.

In order to remove any $SO_2$ present in the system and possibly formed additionally, it is recommended to connect a $SO_2$ degassing system to downstream of the $H_2S$ degassing system.

With a continuous method it has proven to be particularly favourable if this is provided within the same container, which is achieved in that the container comprises a subsequent chamber (the third chamber if two chambers are originally used) for removing $SO_2$. This third chamber adjoins the first chamber and is separated by a partition wall, which is open such as in the lower part however, so that a constant feed of sulphur is enabled between the second and third chambers. In the second area flooded with gas the partition wall also does not terminate flushly so that an open area such as formed in the upper part is provided and therefore an incoming gas flow can flow out of the third chamber and into the second and first chambers. Each chamber thus has a first area flooded with liquid sulphur and a second area flooded with gas.

The method according to the invention and the device according to the invention for carrying out this method are used in particular with liquid sulphur, which contains dissolved impurities in the form of $H_2S$, $H_2S_x$, $SO_2$ and other sulphur compounds which may be present. The method is most frequently applied with sulphur produced in sulphur recovery plants which originates from the acid gases formed during desulphurisation of natural gas and crude oil raffinate. In this case the sulphur production plants (or Claus units)) are designed in conjunction with a tail gas treating plant (TGT). These plants are generally referred to as "Claus plants" or "sulphur plants". The acid gases prepared in these plants consist substantially of $H_2S$, $CO_2$ and small amounts of hydrocarbon. In the refining of crude oil, some of the acid gas may also contain ammonia, which is the case with the acid gas produced by stripping of the sour water. The liquid sulphur generated and collected in these Claus plants contains 250 to 500 ppm by weight of dissolved total hydrogen sulphide in bound form as hydrogen sulphide and hydrogen polysulphides.

The invention is also applied to "FRASCH" sulphur, an elemental sulphur extracted from mines, which is obtained in the liquid state from natural deposits with the aid of the FRASCH method. This sulphur, which may also contain traces of $H_2S$ in an amount of 100 to 200 ppm by weight, is also suitable for this degassing method.

In an embodiment, a method for degassing liquid sulphur in a container is provided. The method can include a first area of the container being flooded with liquid sulphur and a second area of the container being flooded with a gas, and a gas flow being injected into the first area, wherein liquid sulphur is sprayed into the second area.

In an embodiment, the gas flow injected into the first area and/or the gas flooding the second area either behaves inertly towards $H_2S$, sulfanes and/or sulphur or is a gas containing oxygen.

In an embodiment, liquid sulphur is pumped from the first area into the second area, where it is sprayed.

In an embodiment, a further gas flow flows through the second area.

In an embodiment, the liquid sulphur is sprayed in counterflow to the gas flow flowing through the second area.

In an embodiment, the liquid sulphur is kept at a temperature of 120 to 140° C. In an embodiment, the liquid sulphur is kept at a temperature of 130 to 135° C.

In an embodiment, the degassing is carried out in different chambers not fully separated from each other, wherein in at least one first chamber $H_2S$ is removed and wherein in at least one chamber downstream of the first chamber $SO_2$ is removed.

In an embodiment, in the first chamber an oxygen containing gas stream is used as the injected gas stream and in at least one chamber downstream of the first chamber for removing $SO_2$ an inert gas is used as the injected gas stream.

In an embodiment, a device for degassing liquid sulphur is provided. The device for degassing liquid sulphur having a container comprising two adjacent areas, the first area being flooded with liquid sulphur and the second area being flooded with gas, and having at least one device for injecting a gas flow into the first area, wherein a device for spraying liquid sulphur opening into the second area.

In an embodiment, a pump fed from the first area, which pump is connected via a line to the device for spraying liquid sulphur.

In an embodiment, a feed line and an outlet line are provided in the second area for a further gas flow.

In an embodiment, the container is divided by a partition wall into at least two chambers which are not completely closed from one another.

Further features, advantages and possible uses of the invention will emerge from the following description and the drawings. All features described and/or illustrated schematically form the subject matter of the invention, either individually or in any combination, irrespectively of their summary in the claims or back-references.

DETAILED DESCRIPTION

FIG. 1 illustrates the reactions in liquid sulphur and material transfer mechanisms involved in the degassing process. It shows, inside a container, a gas phase GAS located above the liquid sulphur S(lq). $H_2S$ dissolved in the liquid sulphur can be transferred by diffusion into the gas phase via 3 interfaces constituted by: 1/stripping gas bubbling in mass sulphur, 2/atomised sulphur in flushing gas, 3/interface between mass sulphur phase (area 2) and flushing gas phase (area 3). At the same time, $SO_2$ can be transferred in the same manner from the liquid phase into the gas phase. Dissolved $H_2S$ in the liquid sulphur is in equilibrium with the formation of hydrogen polysulphides. Water, sulphur, $SO_2$ and $SO_3$ can be produced from the hydrogen sulphide when GAS contains oxygen. Similar reactions also occur with hydrogen polysulphides and oxygen.

Figure 2:
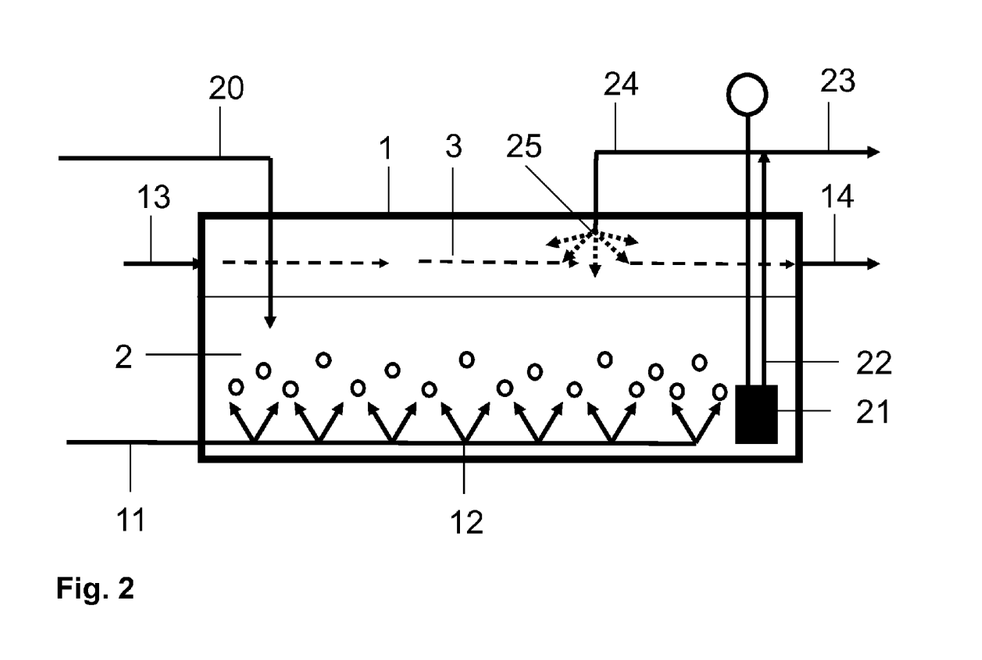
FIG. 2 is a schematic view of an embodiment according to the invention of a batch reactor.

FIG. 2 shows the design of the device according to the invention when it is implemented in discontinuous mode with a batch reactor. This reactor comprises a container 1 which is divided into the two areas 2 and 3. As the first area, the area 2 is flooded with liquid sulphur whilst the second area 3 is flooded with gas.

A line 11 is guided into the first area 2, through which line a system for injecting stripping gas is fed with the stripping gas. This injection device 12 comprises a multiplicity of nozzles to create a fine dispersion of stripping gas in the bulk sulphur.

Furthermore, gas is flushed through the second area 3, which gas flows in via a line 13 and escapes via a line 14. The gas flows basically parallel to the surface of the liquid sulphur. The gaseous sulphur compounds removed from the liquid sulphur are carried over in the gas drawn via the line 14.

The container is filled with liquid sulphur via a line 20. This filling process does not take place continuously, but at the beginning of the method. Liquid sulphur can be removed from the first area via the pump system 21 via lines 22 and 24 and fed to an atomising device 25. This atomising device opens into the second area 3, where it atomises the liquid sulphur from the first area 2 into the second area 3 flooded with a gas mixture.

Once the reactor 1 has been degassed, the liquid sulphur can be pumped out from the container 1 via the line 22 and the line 23 with the aid of the pump 21.

Figure 3:
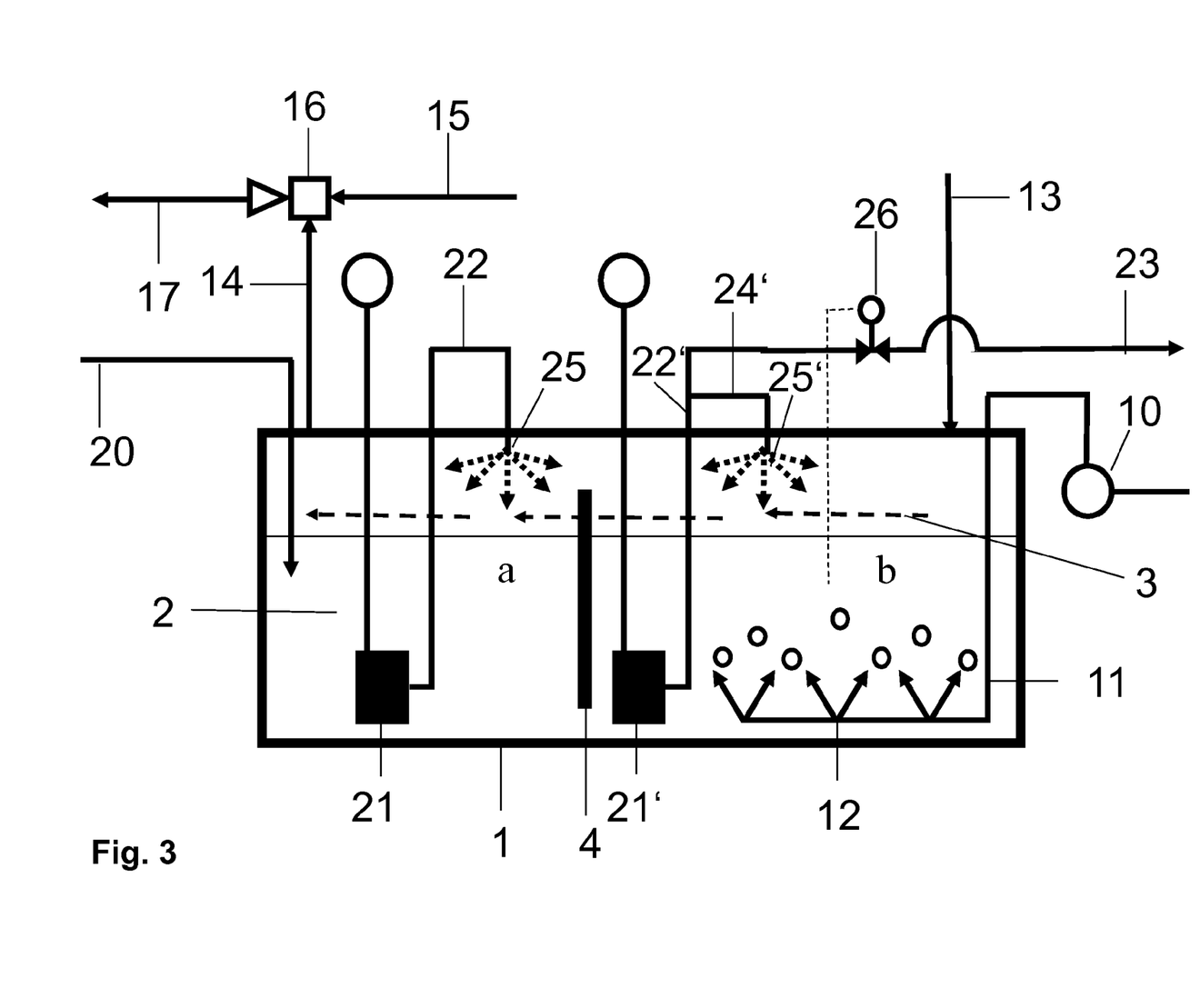
FIG. 3 is a schematic view of an embodiment according to the invention of a continuous method.

FIG. 3 shows the design of a plant according to the invention for carrying out a continuous method. The method takes place in a container 1 which comprises a first area 2 flooded with liquid sulphur and a second area 3 flooded with gas. In addition, the container 1 is divided into two chambers a, b by a partition wall 4, wherein the partition wall 4 does not terminate flushly, and therefore the two chambers a, b are interconnected both through openings below and above the partition wall 4. The bottom opening allows the sulphur to flow continuously from chamber a to chamber b, and the above opening allows the flushing gas to flow at countercurrent from chamber b to chamber a. A stripping gas is fed to the spraying device 12 via the pump 10 and the line 11, through which injection device stripping gas is dispersed into the second chamber via a plurality of nozzles. The injection for the stripping gas can be provided at the base of the second chamber, however it is also possible to perform the injection in the first chamber or in both chambers. The embodiment shown has the advantage that the amounts of dissolved hydrogen sulphide and hydrogen polysulphides have already decreased in the first chamber and, in the second chamber, the additional bubbling through is only undertaken to reach the legally prescribed threshold of residual H2S in degassed sulphur. The number of bubbling through devices requires is thus reduced, minimal oxygen is introduced into the system with use of air, and at the same time a sufficiently good yield is obtained.

A gas flow is also introduced, via the line 13, into the second area 3 flooded with gas, which gas flow flows out from the second chamber b in counterflow to the direction of flow of the liquid sulphur and into the first chamber a, from which it is removed via the line 14. The removal takes place via an appropriate educting device, such as a steam ejector, which is fed via the line 15. The contained mixture from the gas flows and gaseous $H_2S$ is then discharged via the line 17.

Liquid sulphur is introduced continuously in the first chamber a via the line 20 into the first area 2 flooded with liquid sulphur. A pump 21 is located herein in the first chamber and draws liquid sulphur via the line 22 from the first area 2 and feeds it to the atomising device 25. This atomising device 25 is located in the second area 3, flooded with gas, of the first chamber. The liquid sulphur partially degassed in chamber a flows to chamber b through the opening at bottom of partition wall 4.

A pump 21' which, via a line 22', takes liquid sulphur from the first area 2 of the second chamber is also located in the second chamber. This is fed, in part, via the line 24' to a second atomising device 25' which atomises liquid sulphur into the gas phase 3 of the second chamber. Liquid sulphur is also drawn from the system via the line 23, wherein the drawn amount corresponds to the fed amount. The removed amount can be controlled via a control device, for example a level control valve 26, to such an extent that the amount of liquid sulphur in areas 2 of the container is such that the total residence time of the sulphur is sufficient to reach the required legal specification of ≤10 ppm by weight $H_2S$. In addition, the feed of sulphur can be regulated or controlled via the line 20 in a manner which is not illustrated.

Figure 4:
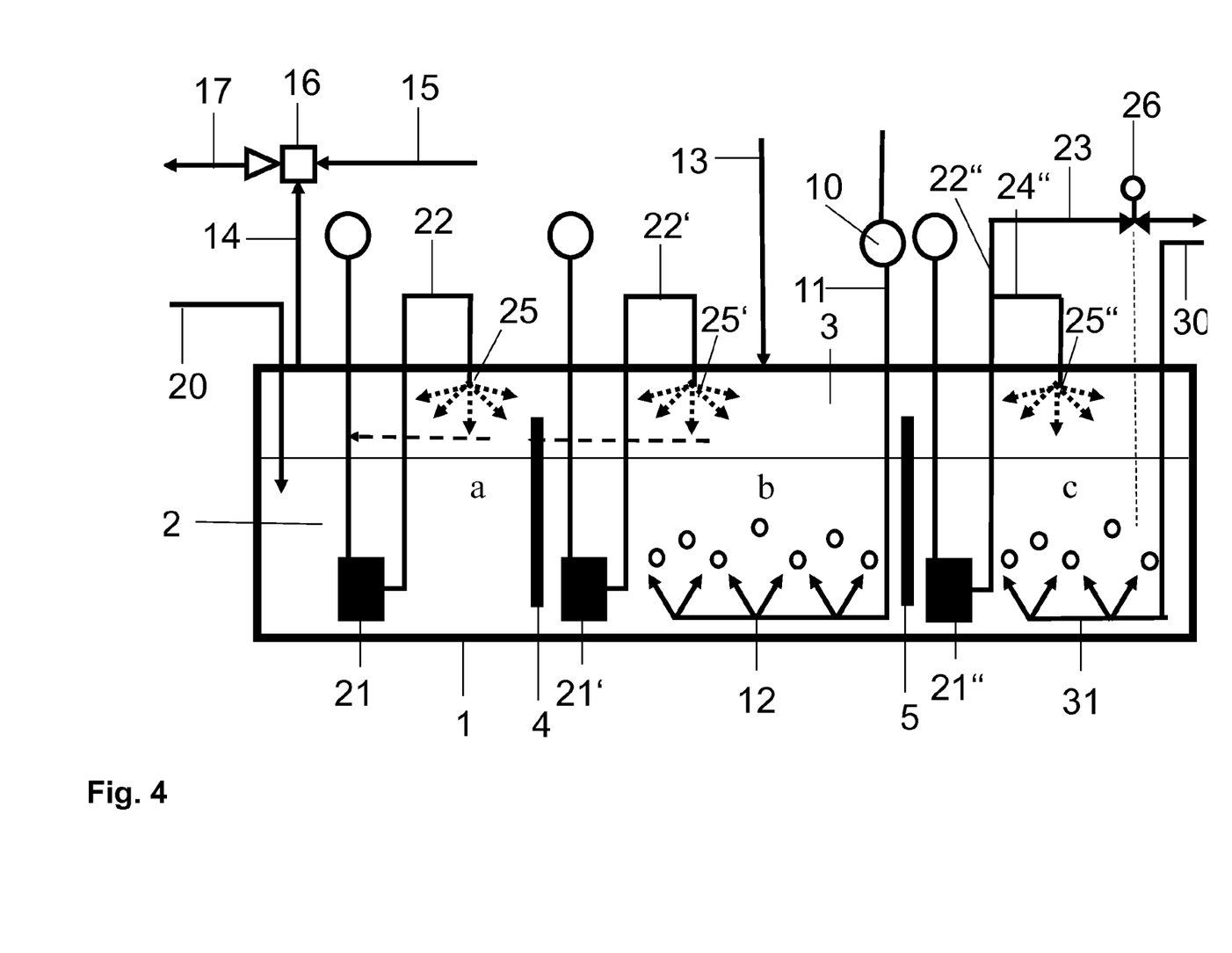
FIG. 4 is a schematic view of an embodiment according to the invention of a continuous method with integrated $SO_2$ degassing.

FIG. 4 shows a continuous method for simultaneous degassing of $H_2S$ and $SO_2$. This method is also carried out in a container 1 which comprises a first area 2 flooded with sulphur and a second area 3 flooded with gas. The container is divided by two partition walls 4 and 5 into three chambers a, b and c, first two chambers a and b being dedicated to H2S removal and third chamber c being dedicated to SO2 removal. The partition walls 4 and 5 are installed in such a way that an opening is created above and below each wall and therefore gas and sulphur can freely circulate at countercurrent from one chamber to the next one.

A first stripping gas, such as air, is fed via the pump 10 and line 11 to the bubbling device 12, such as a multiplicity of nozzles. This introduction of the stripping gas occurs in the second chamber b. In this chamber b, a gas flow is also injected into the second area 3, filled with gas, via the line 13. The total flow of gases introduced via lines 11 and 13 then sweeps the area 3 of chamber a and then escapes from the container via the line 14 in carrying away the $H_2S$ drawn from the liquid sulphur. This line 14 opens into an educting system 16, which can be designed as a steam rejector which is fed with the propellant via the line 15. The total gas volume of the method can then ultimately be discharged via the line 17.

Liquid sulphur to be degassed is introduced via the line 20 into the first chamber a. This sulphur is recirculated into the first chamber a, via the pump 21, in the line 22, which opens into an atomising device 25. This atomising device 25 is located in the second area 3 of the first chamber a.

The same device for recirculation and atomisation of the sulphur is also located in the second chamber b, where a pump 21' feeds liquid sulphur via the line 22' to an atomising device 25', which atomises the liquid sulphur in the second area 3, flooded with gas, of the second chamber b.

Lastly, the third chamber c which is dedicated to the removal of SO2 is equipped in the same manner with an atomising and recirculation pump 21" which feeds the atomising device 25" via the line 22" and the line 24". The atomising device 25" is provided in the gas phase 3 of the third chamber c. At the same time, some of the liquid sulphur, which is now degassed, can be drawn from the container via the lines 22" and 23.

The flow of degassed sulphur is drawn off at the rate of the crude sulphur feeding the container via the line 20. It can be achieved by means of a control device such as a level control valve 26 on the withdrawal line 23; this control valve continuously maintaining the sulphur at a level in the container such as it provides the residence time needed to achieved the prescribed specifications of residual H2S and SO2 in the degassed sulphur.

Lastly, in the third chamber c, a stripping gas is introduced into an injection device 31 via the line 30. This injection device 31 that is constituted of a plurality of nozzles installed at the bottom of the liquid phase ensures the proper dispersion of the stripping gas throughout the sulphur mass. This stripping gas can be inert gas, such as nitrogen, whilst air is injected via the fan 10 and line 11. The gas flow introduced via the line 13 can be air.

The stripping gas flow introduced via the line 30, after it has contacted countercurrently the sulphur is directed to gas phase of the chamber b wherein it is mixed with the stripping gas and flushing gas respectively fed in through the lines 11 and 13. This mixture of gases is then routed to the gas phase of chamber a. The total flow of gases thus introduced in the container is withdrawn via an appropriate educting device 16, can be a steam ejector which is fed via the line 15. The total mixture of gas flows containing degassed H2S and SO2 is then discharged via line 17.

LIST OF REFERENCE NUMERALS

1 container
2 first area (liquid phase)
3 second area (gas phase)
4, 5 partition wall
10 fan-blower
11 line
12 bubbling device
13, 14, 15 line
16 educting device
17 line
20 line
21 pump
22, 23, 24 line
25 bubbling device
26 control device
30 line
31 injection device
a first chamber
b second chamber
c third chamber

The invention claimed is:

1. A continuous method for degassing liquid sulphur in a container being divided into three chambers, a first area of the container being flooded with liquid sulphur and a second area of the container being flooded with a gas, and a gas flow being injected into the first area, wherein liquid sulphur is sprayed into the second area;
   wherein the degassing is carried out in the three chambers not fully separated from each other,
   wherein liquid sulphur is introduced continuously in the first chamber;
   wherein in at least a first and a second chamber of the three chambers $H_2S$ is removed and wherein in a third chamber downstream of the first and second chambers $SO_2$ is removed;
   wherein in the second chamber an oxygen containing gas stream is used as an injected gas stream and in the third chamber downstream of the first and second chambers an inert gas is used as an injected gas stream;
   wherein at least some of the degassed liquid sulphur is drawn from the third chamber.

2. The method according to claim 1, wherein liquid sulphur is pumped from the first area into the second area, where it is sprayed.

3. The method according to claim 1, wherein a further gas flow flows through the second area.

4. The method according to claim 3, wherein the liquid sulphur is sprayed in counterflow to the gas flow flowing through the second area.

5. The method according to claim 1, wherein the liquid sulphur is kept at a temperature of 120 to 140° C.

6. The method according to claim 1, wherein the liquid sulphur is kept at a temperature of 130 to 135° C.

* * * * *